US011455628B2

(12) United States Patent
Maheshwari et al.

(10) Patent No.: US 11,455,628 B2
(45) Date of Patent: Sep. 27, 2022

(54) SYSTEMS AND METHODS FOR FACILITATING NETWORK TRANSACTIONS BASED ON USER AUTHENTICATION

(71) Applicant: MASTERCARD INTERNATIONAL INCORPORATED, Purchase, NY (US)

(72) Inventors: Rajat Maheshwari, Singapore (SG); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 286 days.

(21) Appl. No.: 16/152,887

(22) Filed: Oct. 5, 2018

(65) Prior Publication Data

US 2020/0111094 A1    Apr. 9, 2020

(51) Int. Cl.
*G06Q 20/40* (2012.01)
*H04L 9/40* (2022.01)

(52) U.S. Cl.
CPC ......... *G06Q 20/40* (2013.01); *H04L 63/0861* (2013.01)

(58) Field of Classification Search
CPC ............................ G06Q 20/40; H04L 63/0861
USPC .......................................................... 705/44
See application file for complete search history.

(56) References Cited

U.S. PATENT DOCUMENTS

| 10,083,444 | B1 | 9/2018 | Schneider et al. | |
|---|---|---|---|---|
| 10,269,010 | B2* | 4/2019 | Tunnell | ............... G06Q 20/363 |
| 10,284,552 | B1* | 5/2019 | Wurmfeld | ............. G06F 21/554 |
| 2012/0018506 | A1* | 1/2012 | Hammad | ........... G06Q 20/3674 235/375 |
| 2016/0019548 | A1* | 1/2016 | Gangi | ................. H04L 63/0861 705/72 |
| 2016/0086161 | A1* | 3/2016 | Zhou | ................... G06F 3/04886 705/44 |
| 2016/0189154 | A1* | 6/2016 | Eramian | ............. G06Q 20/405 705/44 |
| 2016/0267486 | A1* | 9/2016 | Mitra | .................... G07F 7/0846 |

(Continued)

OTHER PUBLICATIONS

Sharma et al., Frequency based Classification of Activities using Accelerometer Data, Aug. 2008, IEEE, pp. 150-153 (Year: 2008).*

*Primary Examiner* — Benjamin S Brindley
(74) *Attorney, Agent, or Firm* — Harness, Dickey & Pierce, P.L.C.

(57) ABSTRACT

Systems and methods are provided for facilitating network transactions based on user authentication. One exemplary method includes, for a network transaction, receiving, at a card device, an authentication command from an issuer of a payment account associated with the card device. A user of the card device is instructed, at an indicator of the card device, to provide a biometric for use in authenticating the user. Biometric data from the user is captured at biometric sensor of the card device, when the user provides the biometric, and the captured biometric data is compared with reference biometric data stored in a memory of the card device. The card device then returns a command reply to the issuer, where the command reply includes an authentication result based on the comparison, thereby permitting the issuer to employ the authentication result of the user in connection with the network transaction.

13 Claims, 3 Drawing Sheets

(56) References Cited

U.S. PATENT DOCUMENTS

| | | | |
|---|---|---|---|
| 2017/0091775 A1* | 3/2017 | Lanc | G06Q 20/405 |
| 2017/0116505 A1* | 4/2017 | Suwald | G06V 40/13 |
| 2017/0193800 A1* | 7/2017 | Marra | G08B 21/24 |
| 2018/0101718 A1* | 4/2018 | Lowe | G06K 9/6289 |
| 2018/0174121 A1* | 6/2018 | Denton | G06Q 20/12 |
| 2018/0225459 A1* | 8/2018 | Zarakas | G06K 19/07381 |
| 2018/0276672 A1 | 9/2018 | Breed et al. | |
| 2020/0013032 A1 | 1/2020 | Moskowitz et al. | |

* cited by examiner

SYSTEMS AND METHODS FOR FACILITATING NETWORK TRANSACTIONS BASED ON USER AUTHENTICATION

FIELD

The present disclosure generally relates to systems and methods for facilitating network transactions based on user authentication, and in particular, to systems and methods for authenticating users in connection with status-indicative card devices utilized for the network transactions.

BACKGROUND

This section provides background information related to the present disclosure which is not necessarily prior art.

For a variety of network transactions, users are authenticated to accounts in order to permit and/or facilitate the transactions. In particular, consumers (broadly, users) are known to use payment accounts to fund transactions for products (e.g., goods and services, etc.) with merchants. In connection therewith, the consumers are often authenticated to their accounts through personal identification numbers (PINs), biometrics, or otherwise, at, for example, point-of-sale (POS) terminals at the merchants. Once the consumers are authenticated, or as part of the authentication process, the merchants initiate purchase transactions for the products through the POS terminals, whereby, if approved, the consumers take possession of the products and/or provide directions for the products' delivery to locations identified by the consumers.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
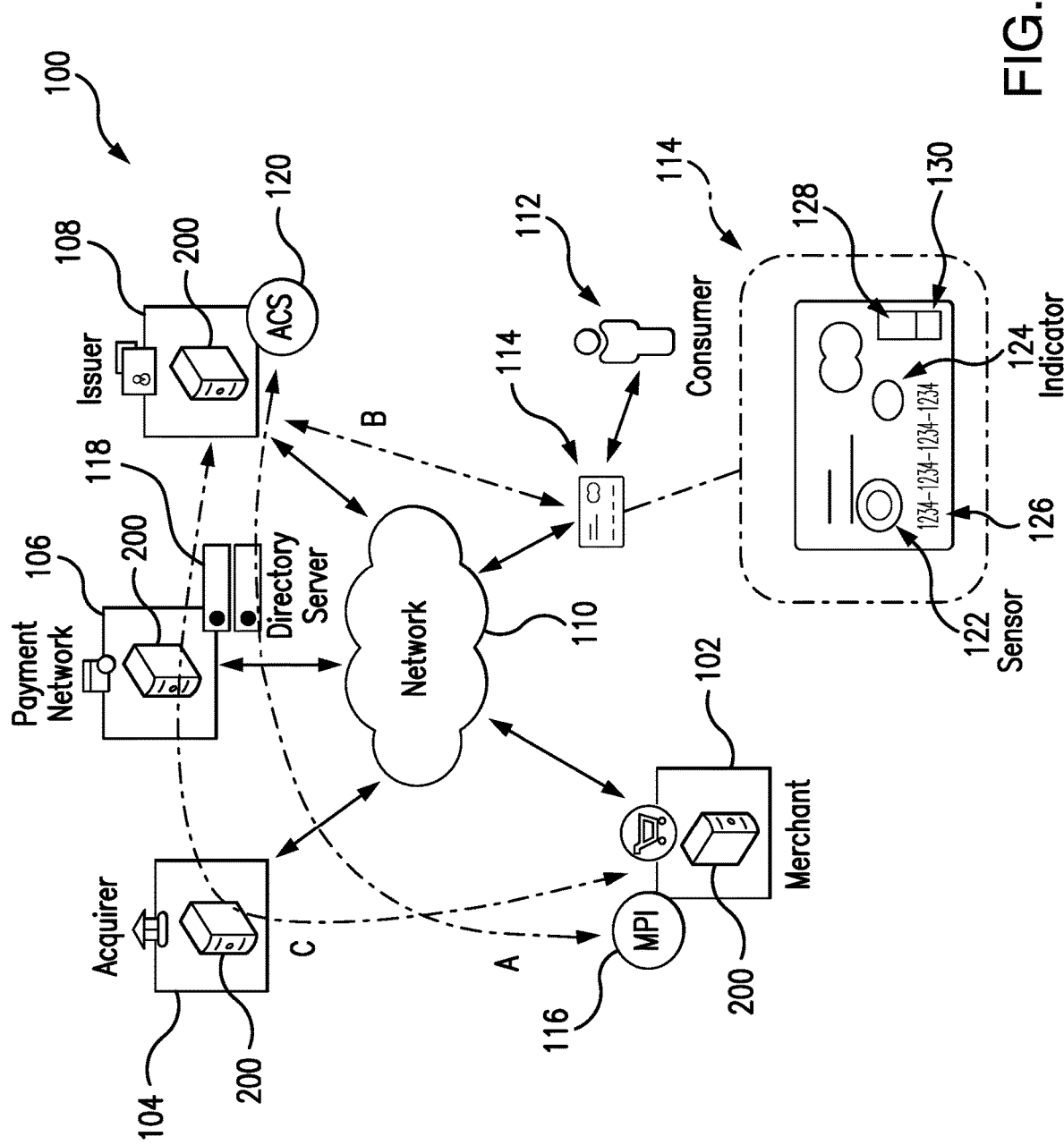
FIG. 1 illustrates an exemplary system of the present disclosure suitable for use in authenticating users in connection with network transactions through on-card authentication.

Exemplary embodiments will now be described more fully with reference to the accompanying drawings. The description and specific examples included herein are intended for purposes of illustration only and are not intended to limit the scope of the present disclosure.

When interacting with a virtual merchant, authentication of a consumer cardholder may be limited. Often, in addition to a credit card, for example, the consumer may have a smartphone to receive a one-time passcode for purposes of authentication (where the smartphone is registered to the consumer). Upon receipt, the one-time passcode may then be provided by the consumer (e.g., at a website or an API accessed by the virtual merchant) and verified by an issuer of the credit card, in connection with a purchase transaction at the virtual merchant, to thereby authenticate the consumer in connection with the transaction. The use of such additional devices (e.g., smartphones, etc.), however, may limit the type and number of customers/consumers that can be authenticated, and may even provide lesser authentication, because no actual authentication is provided at the smartphones and because unauthenticated users with access to the smartphones may be able to view the one-time passcodes and utilize them in transaction without authorization. In addition, the difficulty involved when users change smartphone devices and/or mobile numbers may be cumbersome, for example, in updating settings associated with one-time passcode authentication in relation to where the one-time passcodes should be sent, etc. Meanwhile, for face-to-face transactions, such concerns may be alleviated as merchants are permitted to check identification of consumers (e.g., driver's licenses, etc.), or the payment devices used in the transactions may provide for biometric authentication, either on the devices or at point-of-sale (POS) terminals used in the transactions.

Uniquely, the systems and methods herein facilitate authentication of the users in online transactions through use of status-indicative card devices. In particular, a card device includes a biometric sensor and indicator. In connection with an online transaction, for example, when enhanced authentication is required (e.g., as described in the EMV 3D Secure™ specification (see, e.g., https://www.emvco.com/emv-technologies/3d-secure/, which is incorporated herein by reference), etc.), a merchant seeks authentication of the consumer through a directory server and an access control server (ACS). In turn, the ACS authenticates the consumer at the status-indicative card device, where the consumer presents a biometric. When biometric data associated with the presented biometric is a match to reference biometric data for the consumer (e.g., the consumer is authenticated), an indicator on the card device informs the consumer, and an advisement is provided to the ACS. The ACS, in turn, responds to the merchant (i.e., to a merchant plug-in (MPI) at the merchant), and the merchant transmits an authorization request for the transaction indicating the authentication. The authorization request is provided, from the merchant, through an acquirer and payment network, to an issuer associated with a payment account for the consumer (and associated with the card device), whereby the purchase transaction is approved or not. In this manner, enhanced authentication of the consumer is provided, in the context of the online/virtual transaction, through use of the status-indicative card device, and without another device, such as, for example, a smartphone, being used or required.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, relationships between merchant(s) and/or payment network(s) in the system 100, types and/or features of card devices employed in the system 100, etc.

As shown in FIG. 1, the illustrated system 100 generally includes a merchant 102, an acquirer 104 associated with the merchant 102, a payment network 106, and an issuer 108 configured to issue payment accounts (or other accounts) to users (e.g., consumers, etc.), each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the merchant 102 and a consumer 112 and/or (a card device 114 associated therewith), etc.

The merchant 102 of the illustrated system 100, in general, offers products (e.g., goods, services, etc.) for sale and/or sells products to consumers, including the consumer 112. In this exemplary embodiment, the merchant 102 includes a virtual merchant location, such as, for example, a website, network-enabled application, etc., which permits consumers to initiate and complete purchase transactions for products while not physically present at the merchant 102.

In addition in the illustrated system 100, the acquirer 104 is associated with the merchant 102. Specifically, for example, the acquirer 104 has issued an account (e.g., a debit account, a savings account, a checking account, etc.) to the merchant 102, into which funds for purchase transactions performed by the consumers at the merchant 102 are deposited. Similarly, the issuer 108 has issued a payment account (e.g., a debit account, a credit account, a prepaid account, etc.) to the consumer 112, which may be used by the consumer 112 to fund a purchase transaction for one or more products (e.g., at the merchant 102, at other merchants, etc.). In connection therewith, the acquirer 104, the payment network 106, and the issuer 108, are configured to cooperate and/or to facilitate the purchase transaction, as described below.

What's more, the system 100 is configured to provide one or more enhanced authentication techniques for purchase transactions involving the consumer 112 (including those performed by the consumer 112 at the merchant 102 (at the virtual merchant location)). In particular, the system 100 is configured to conform to the EMV 3D Secure™ specification for providing such enhanced authentication techniques. As such, as shown in FIG. 1, the system 100 includes a merchant plug-in (MPI) 116, which is incorporated in and/or associated with the merchant 102 (whereby reference to the merchant 102 and the MPI 116 herein may be interchangeable). The system 100 also includes a directory server 118, which is incorporated in and/or associated with the payment network 106, and an access control server (ACS) 120, which is incorporated in and/or associated with the issuer 108 (whereby reference to the issuer 108 and the ACS 120 herein may be interchangeable). Relative operation(s) of the MPI 116, the directory server 118, and the ACS 120, in connection with the enhanced authentication techniques included in the system 100, are described below. That said, it should be appreciated that in other embodiments, the system 100 may be configured to conform, in whole or in part, to another standard for providing enhanced authentication techniques (e.g., a standard other than the 3D Secure™ specification standard, etc.).

The card device 114 of the system 100 includes a sensor 122, which is a biometric sensor in this embodiment, and an indicator 124, which is a light-emitting diode (LED) indicator in this embodiment (broadly, a visual indicator). It should be appreciated that the card device 114 may include one or more input devices in addition to, or other than, the sensor 122 in one or more other embodiments, whereby identifying data of the consumer 112 and/or data known to the consumer 112 may be provided to the card device 114 via the one or more input devices. Likewise, the card device 114 may include one or more output devices in addition to, or other than, the indicator 124 in one or more other embodiments (e.g., a presentation unit, etc.) that also or similarly provides a message or notice or other visual or audible indicator to the consumer 112 (or others) (e.g., where the notice is "biometric authentication required," etc.). It should also be appreciated that other card devices may be employed in other system embodiments.

In addition, the card device 114 includes a power supply such as a battery, etc., whereby the card device 114 is powered without being inserted into or in contact/proximity with a terminal (e.g., a POS terminal, etc.). Further, it should be understood that the card device 114 is associated with the payment account issued to the consumer 112, by the issuer 108, whereby a payment account credential for the payment account (illustrated as including a primary account number (PAN) 126 in FIG. 1) is written on or otherwise included in/on the card device 114. As such, the card device 114 can be used to initiate online transactions as described herein, and also can be used to initiate transactions at physical merchant locations (e.g., at POS terminals located at the merchants, etc.) in conventional manners. With that said, the payment account credential may additionally, or alternatively, include a card verification code (CVC), an expiration date for the card device 114, etc.

In the illustrated system 100, the card device 114 includes a card body, which forms the general shape of the card device 114. The card body defines a front side, as shown in FIG. 1, and a back side (not shown in FIG. 1). Both the biometric sensor 122 and the indicator 124 are included on the front side of the card device 114, and in particular, on the front side of the card body (although this is not required in all embodiments). Moreover, the card device 114 includes the payment account credential (i.e., the PAN 126) embossed, etched, written, and/or otherwise included on the front side (e.g., as an embossed portion of the card device 114, etc.). Also, as shown, the card device 114 includes a processor 128, which is consistent with the processors described herein, whereby the card device 114 is configured and/or suited to perform operations described herein. Specifically, the processor 128 is coupled in communication with both the biometric sensor 122 and to the indicator 124. As such, the processor may be configured to capture biometric data via the biometric sensor 122 (for a biometric of the user presented to the card device 114) and/or to toggle the indicator 124 ON/OFF at a defined interval, whereby the indicator 124 (when it includes an LED, for example) blinks, for example, based on the captured biometric data (or for one or more other reasons).

Moreover, the illustrated card device 114 includes a network interface 130, which may be a modem or other device configured to connect to and/or communicate with one or more wireless networks, such as, for example, network 110 (e.g., configured to facilitate wireless communication between the card device 114 and another part of the system 100, etc.). For example, in one implementation of the system 100, the network interface 130 of the card device 114 may include a modem, and the card device 114 may include a mobile identification number (MIN) (broadly, device ID) assigned thereto during initial provisioning of the card device 114, whereby the MIN can be used to identify the card device 114. The issuer 108, then, may identify the card device 114 by the MIN and communicate therewith via the network 110 (e.g., using conventional wireless protocols (e.g., DTM, SMS, etc.), etc.). Alternatively, or additionally, in another implementation, the card device 114 may include a different device ID such as, for example, a MAC address, an IP address, an ESN, a serial number, etc., whereby the issuer 108 may identify the card device 114 based on the device ID and communicate therewith as desired. As shown in FIG. 1, the processor 128 and the network interface 130 may be separate components of the card device 114, or they may optionally be integrated into a signal component, as could the biometric sensor 122 and/or the indicator 124, for example, in other card device embodiments.

In the exemplary system 100, the card device 114 is subject to and complies with the ISO/IEC 7810 ID-1 standard, which generally indicates the physical dimensions and/or dimensional proportions of the card device 114 (i.e., where the card device 114 is a payment card as in this instance) (e.g., the card device 114 may have dimensions of about 3.375 inches (about 85.60 mm) by about 2.125 inches (about 53.98 mm); etc.). In addition, and as described above, the card device 114 may be used in purchase transactions at physical merchant locations. As such, the card device 114 may also include an EMV chip, a magnetic strip, etc. associated therewith (and/or included thereon) comprising data regarding the consumer's payment account, etc. Of course, however, other payment device embodiments may be constructed according to one or more different standards, for example, where the given payment device is not specifically formed as a payment card (e.g., where the given payment device has a smaller size and/or different shape than a traditional payment card, etc.).

Also in the exemplary system 100, and as mentioned above, the card device 114 is associated with the payment account issued to the consumer 112 by the issuer 108. As such, the issuer 108 includes, in memory thereof, a user profile associated with the consumer 112. The user profile indicates, to the issuer 108, a type of the card device 114 associated with the payment account. Here, the user profile indicates that the card device 114 is an on-card direct authentication card device, whereby consumer authentication directly on the card device 114 is permitted. Due to the type of the card device 114, the user profile further indicates that the consumer 112 and/or the payment account associated therewith is a participant in the on-card direct authentication service offered by the issuer 108. What's more, the user profile also includes a MIN or other device ID for the card device 114 so that the issuer 108 is able to identify and/or communicate with the card device 114, as described above (and more below).

While only one merchant 102, one acquirer 104, one payment network 106, one issuer 108, one MPI 116, one directory server 118, and one ACS 120 are illustrated in FIG. 1, it should be appreciated that any number of these parts and/or entities (and their associated components) may be included in the system 100, or may be included as a part of systems in other embodiments, consistent with the present disclosure. Likewise, it should be appreciated that the system 100 and/or other system embodiments will generally include multiple consumers, each associated with at least one payment account and at least one card device as described herein, etc.

Figure 2:
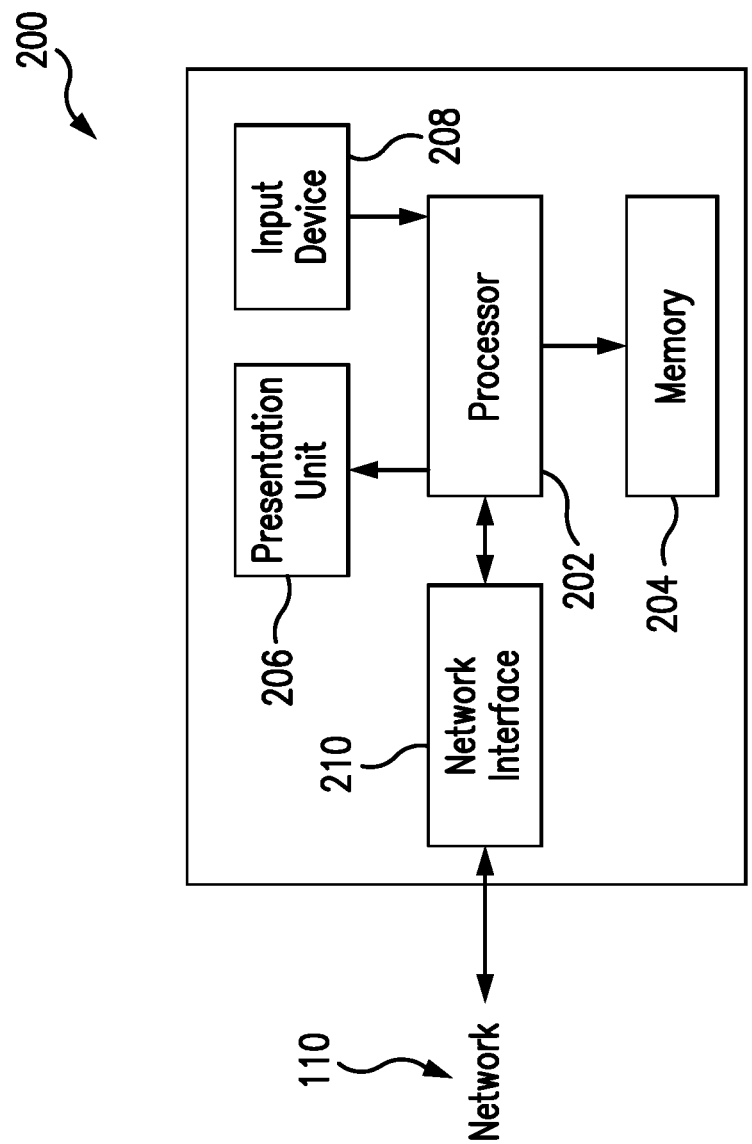
FIG. 2 is a block diagram of a computing device that may be used in the exemplary system of FIG. 1.

FIG. 2 illustrates an exemplary computing device 200 that may be used in the system 100. The computing device 200 may include, for example, one or more servers, workstations, personal computers, laptops, tablets, smartphones, virtual reality devices (e.g., headsets, gloves, suits, etc.), etc. In addition, the computing device 200 may include a single computing device, or it may include multiple computing devices located in close proximity or distributed over a geographic region, so long as the computing devices are specifically configured to operate as described herein. In the exemplary embodiment of FIG. 1, each of the merchant 102, the acquirer 104, the payment network 106, and the issuer 108 are illustrated as including, or as being generally implemented in, computing device 200, coupled to (and in communication with) the network 110. In addition, the card device 114 associated with consumer 112, the MPI 116, the directory server 118, and the ACS 120 can also be considered a computing device consistent with computing device 200. However, with that said, the system 100 should not be considered to be limited to the computing device 200, as described below, as different computing devices and/or arrangements of computing devices may be used.

Referring to FIG. 2, the exemplary computing device 200 includes a processor 202 and a memory 204 coupled to (and in communication with) the processor 202. The processor 202 (as well as the processor 128) may include one or more processing units (e.g., in a multi-core configuration, etc.). For example, the processor 202 (as well as the processor 128) may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices (e.g., EMV chips, etc.), flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account credentials, reference biometric data, captured biometric data, authentication requests, authentication responses, authentication codes (e.g., accountholder authentication value (AAV) codes, etc.), user profiles, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, such as indicators of successful authentications, audibly or visually, for example, to a user of the computing device 200, such as the consumer 112 in the system 100 (e.g., at the card device 114, etc.), etc. The presentation unit 206 may include, without limitation, an indicator (e.g., indicator 124, etc.), a liquid crystal display (LCD), a light-emitting diode (LED)

or LED display, an organic LED (OLED) display, an "electronic ink" display, speakers, etc. In some embodiments, presentation unit 206 may include multiple devices.

In addition, the computing device 200 includes an input device 208 that receives inputs from the user of the computing device 200 (i.e., user inputs) such as, for example, biometric inputs (e.g., at the card device 114, etc.), etc., as further described below. The input device 208 may include a single input device or multiple input devices. The input device 208 is coupled to (and is in communication with) the processor 202 and may include, for example, one or more of a sensor (e.g., sensor 122, etc.), a keyboard, a pointing device, a mouse, position sensors, fingerprint sensors, heartbeat sensors, motion sensors, or any other type of sensor, a touch sensitive panel (e.g., a touch pad or a touch screen, etc.), another computing device, and/or an audio input device, etc. Further, in various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 (as well as the network interface 130) may include, without limitation, a wired network adapter, a wireless network adapter (e.g., Wi-Fi adapter, a near field communication (NFC) adapter, a Bluetooth adapter, etc.), a mobile network adapter, or other device capable of communicating to one or more different networks, including the network 110. Further, in some exemplary embodiments, the computing device 200 may include the processor 202 and one or more network interfaces incorporated into or with the processor 202.

In various embodiments, the card device 114 of the system 100 may include an EMV (Europay®, MasterCard® and Visa®) chip, incorporating the processor 128 and/or the network interface 130. In connection therewith, the card device 114 may be configured, via the EMV chip, for communication in accordance with the EMV 3D Secure™ specification discussed herein.

Referring again to FIG. 1, when the consumer 112 initiates a payment account transaction in the system 100, at the merchant 102 (in particular, at the virtual merchant location of the merchant 102), such as, an online transaction, the consumer 112 enters and/or otherwise provides at least one payment account credential (from the card device 114) (e.g., the PAN, the expiration date, the CVC, etc.) to the merchant 102. In turn, the merchant 102 is configured to cause the MPI 116 to compile and transmit an authentication request (AReq) for the transaction to the directory server 118 (along path A in FIG. 1), where the AReq includes details of the purchase (and, potentially, of the card device 114, etc.). The directory server 118 is configured to then transmit the AReq to the ACS 120 (as associated with the issuer 108 of the payment account involved in the transaction), again, along path A.

In turn, the ACS 120 is configured to determine whether or not the consumer 112 is a participant for the on-card direct authentication service offered by the issuer 108 (e.g., by interacting with a data structure of listed registered accounts maintained by the issuer 108, or by inquiring with the issuer 108, etc.) (and, potentially, to perform an initial evaluation of the purchase transaction and/or the consumer's payment account, based on the transaction details included in the AReq, to determine if the transaction appears valid, etc.). If the consumer 112 is not a participant for the on-card direct authentication service offered by the issuer 108, the ACS 120 is configured to process the transaction (e.g., based on the initial evaluation, etc.), and proceed therewith as is conventional. However, if the ACS 120 determines that the consumer 112 is a participant for the on-card direct authentication service, the ACS 120 is configured to request authentication of the consumer 112, for example, from the issuer 108 (e.g., via a request message or other communication to/with the issuer 108, etc.). In particular, upon determining that the consumer 112 is a participant, the ACS 120 is configured to compile and transmit an authorization response (ARes) to the MPI 116, via the directory server 118, back along path A (in FIG. 1). The ARes generally includes a network address to be called by the merchant 102 and/or the MPI 116, which in turn causes a message to display at the virtual merchant location informing the consumer 112 to authenticate himself/herself using the card device 114. The issuer 108, at about the same time (or earlier or later), is configured to communicate an authentication command to the card device 114, along path B in FIG. 1 (e.g., via the network interface 130 and network 110, etc.). And, in connection therewith, the indicator 124 on the card device 114 may illuminate indicating to the consumer 112 that the issuer 108 is requesting authentication (e.g., biometric authentication via sensor 122, etc.) (and which is also confirmed/instructed by the message displayed at the virtual merchant location).

In response to the authentication command from the issuer 108, the card device 114 is configured to instruct the consumer 112 to be authenticated at the card device 114. In this exemplary embodiment, the card device 114 is configured to toggle the indicator 124 ON/OFF at a defined interval (broadly, activate the indicator 124), whereby the indicator 124 blinks. It should be appreciated that in another embodiment, the card device 114 may be configured to simply turn on the indicator 124 or turn off the indicator 124 (rather than toggling it on and off), or otherwise provide an instruction, via the indicator 124, to the consumer 112 (e.g., a noise/sound, a message, a change in color of the indicator 124, a haptic output, a vibratory output, etc.). Upon seeing the blinking (and the corresponding message at the virtual merchant location), in this example, the consumer 112 understands the instruction and applies a finger to the biometric sensor 122 (or other biometric or input depending on the type of sensor and/or presentation device included). The card device 114, in turn, is configured to capture biometric data (e.g., fingerprint data for the consumer's finger, etc.) from the biometric sensor 122, and to compare the captured biometric data to biometric reference data (e.g., a reference fingerprint for the consumer 112, etc.) stored in memory (e.g., memory 204) of the card device 114. The card device 114 is configured to then halt the toggling (or activation) of the indicator 124 (when the biometric data is captured and/or when a match is determined) and to transmit a command reply back to the issuer 108 along path B (via the network interface 130), where the reply includes a result of the comparison of the captured biometric data and the reference biometric data (e.g., a success or failure flag, etc.). In turn, the issuer 108 is configured to provide the result of the authentication to the ACS 120. It should be appreciated that a positive result of the comparison, as reported in the reply, indicates that the consumer 112 was successfully authenticated.

Conversely, when authentication of the consumer 112 at the card device 114 is not successful (e.g., when the biometric data is not captured at the card device 114 and/or when a match is not determined, etc.), the card device 114 is configured to transmit a command reply back to the issuer 108 reporting the unsuccessful authentication of the consumer 112. The issuer 108, then, is configured to provide the result of the authentication to the ACS 120. And, the ACS 120 may transmit another message to the MPI 116 (e.g., via the directory server 118 or not, etc.) having a network address that can be called by the merchant 102 and/or the MPI 116, in turn causing another message to display at the virtual merchant location informing the consumer 112 that authentication is not successful (and requesting the consumer 112 to retry authentication). Further, the issuer 108 may transmit another authentication command to the card device 114 to allow the consumer 112 to attempt the authentication again.

In connection with the above, when the consumer 112 is successfully authenticated by the card device 114, the ACS 120 is configured to next return a results response to the directory server 118, again along path A in FIG. 1 (e.g., where the results response includes an AAV representative of the authentication of the consumer 112, etc.). The directory server 118, in turn, is configured to return the results response to the merchant 102 (and specifically, to the MPI 116), along path A. The results response may include an authentication code for the purchase transaction (indicating the issuer 108 has authenticated the consumer 112), such as, for example, as part of the AAV, which is consistent with the 3D Secure™ specification, etc. Conversely, when authentication of the consumer 112 at the card device 114 is not successful (either after one attempt or after multiple attempts), the ACS 120 is configured to similarly return a results response to the directory server 118 (and to the MPI 116) with an indication that authentication has failed.

In response to receiving the results response that includes the authentication code for the purchase transaction, the merchant 102 is configured to compile an authorization request for the transaction, which includes the authentication code, and to conventionally transmit the authorization request to the acquirer 104 (along path C in FIG. 1). In turn, the acquirer 104 communicates the authorization message through the payment network 106 (e.g., through MasterCard®, VISA®, Discover®, American Express®, etc.) to the issuer 108. In response to the authorization request, the issuer 108 determines whether the transaction should be approved, for example, based on whether the payment account associated with the consumer 112 is in good standing and includes sufficient funds and/or credit to cover the transaction. In addition, the issuer 108 is configured to communicate with the ACS 120 to confirm the authentication code included in the authorization request (from the results response) (and consistent with conventional 3D Secure™ specification operations). After approving or declining the transaction, the issuer 108 is configured to then transmit an authorization reply back, along path B, to the merchant 102, which (if approved) facilitates completion of the transaction with the consumer 112 in the virtual merchant location setting (e.g., by presenting a receipt to the consumer 112, by delivering the product to the consumer 112 in the virtual merchant location setting, etc.).

At some time later, the purchase transaction, along with one or multiple other purchase transactions, is/are cleared and settled by and between the involved parts of system 100, as is generally conventional (for example, consistent with agreements between the acquirer 104, the payment network 106, the issuer 108, etc.).

Figure 3:
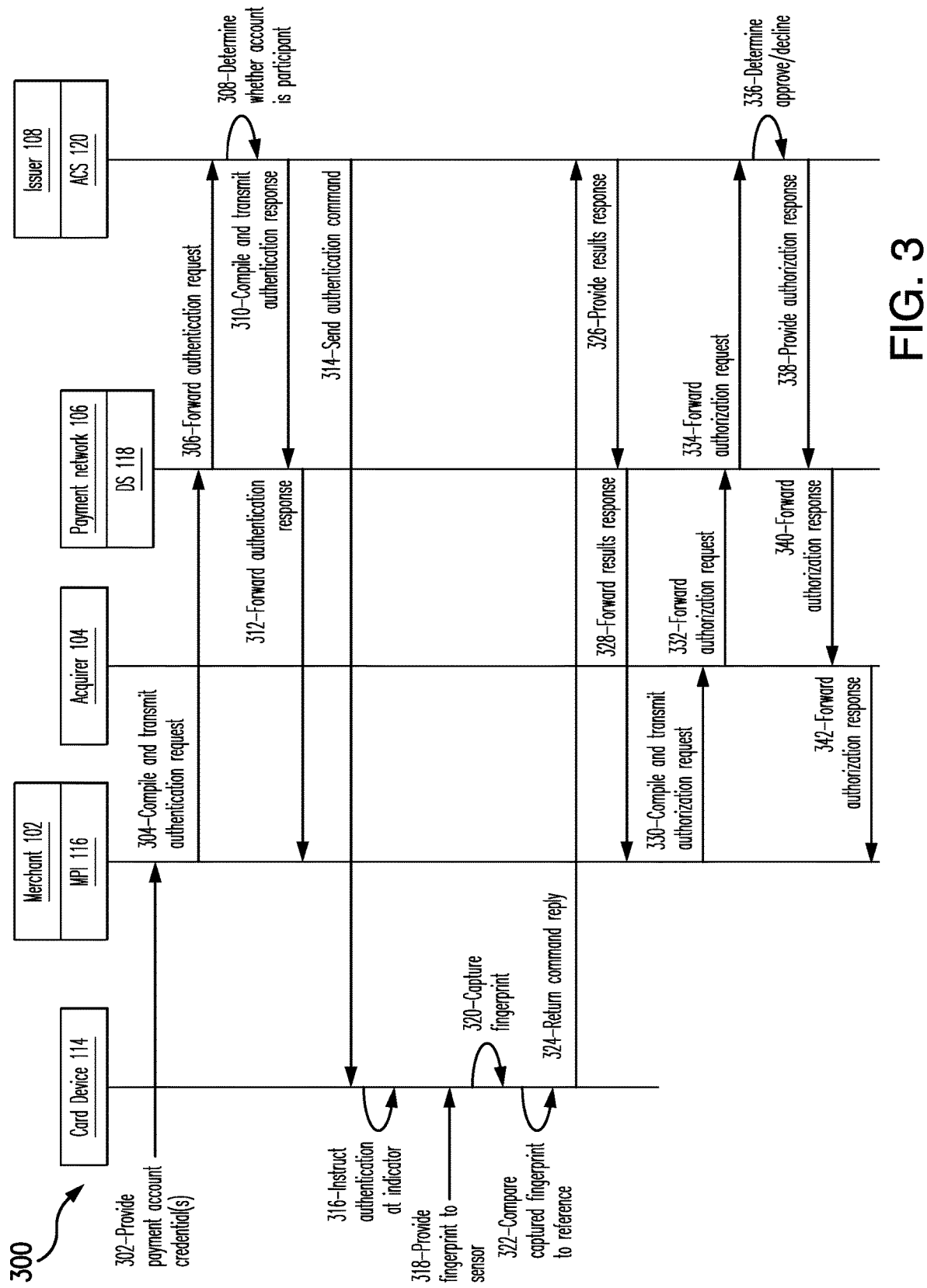
FIG. 3 is a flow diagram of an exemplary method, which may be implemented in connection with the system of FIG. 1, for authenticating a user in connection with a network transaction through on-card authentication at a card device associated with the user.

FIG. 3 illustrates an exemplary method 300 for use in facilitating network transactions based on user authentication at a card device. The exemplary method 300 is generally described in connection with the issuer 108, the ACS 120, the consumer 112, and the card device 114 of the system 100, and in conjunction with the other entities in FIG. 1. Reference is also made to the computing device 200 of FIG. 2. However, the methods herein should not be understood to be limited to the system 100 or the computing device 200, as the methods may be implemented in other systems and/or computing devices. Likewise, the systems and the computing devices herein should not be understood to be limited to the exemplary method 300.

In the method 300, when the consumer decides to purchase a product from the merchant 102, at the virtual merchant location, the consumer 112 initiates an online transaction. In connection therewith, the consumer 112 provides, at 302, one or more payment account credentials to the merchant 102 (via the virtual location) for his/her card device 114. The payment account credential(s) may include, for example, the PAN for the consumer's payment account, the expiration date for the card device 114, the CVC associated with the card device 114, etc. As indicated, the payment account credential(s), in general, is/are obtained from the card device 114 and provided, by the consumer 112, to the merchant 102 via the virtual merchant location (e.g., where the credential(s) is/are embossed or included on/in the card device 114, etc.).

Because the merchant 102 is enrolled for enhanced authentication (e.g., consistent with the 3D Secure specification, etc.), in response to the payment account credential(s) provided by the consumer 112, the merchant 102, and in particular, the MPI 116, compiles and transmits, at 304, an authentication request (AReq) to the directory server 118. The AReq includes details of the purchase and of the credential(s) (in whole or in part) for the payment account/card device 114. The directory server 118, in turn, identifies the respective ACS 120 for the issuer 108 (i.e., the issuer of the consumer's payment account to which the transaction is directed) and forwards the AReq to the ACS 120, at 306.

Upon receipt of and in response to the AReq, the ACS 120 determines, at 308, whether the payment account is a participant in on-card direct authentication (e.g., the ACS 120 may initiate an inquiry to the issuer 108 to determine if the consumer 112 is associated with a biometric card device having authentication capability (such as card device 114), and to determine if the transaction appears valid and/or if the consumer's payment account has sufficient funds to complete the transaction; etc.). In this embodiment, the consumer 112 has registered the payment account with the issuer 108 for on-card direct authentication, so that the account is a participant in the on-card direct authentication service, which is indicated in a user profile associated with the consumer 112 and/or the payment account. Upon understanding the participation of the card device 114 and/or the payment account, the ACS 120 compiles and transmits, at 310, an ARes to the directory server 118, which then forwards, at 312, the ARes to the MPI 116. As described above in the system 100, the ARes includes a network address that may be called by the merchant 102 and/or the MPI 116 to cause a message to display at the virtual merchant location (of the merchant 102) informing the consumer 112 to authenticate himself/herself using the card device 114. In addition, the ACS 120 also instructs the issuer 108 to authenticate the consumer 112 through the on-card direct authentication service. In connection therewith, the issuer 108 sends, at 314, an authentication command to the card device 114, via the network 110. In various embodiments, the issuer 108 may identify the card device 114 based on a device ID assigned thereto (e.g., a MIN, an ESN, etc.)

(which is stored in and/or provisioned to the card device 114) and included in the user profile for the consumer 112 (and, based thereon, further identify the card device 114 as an on-card authentication device), prior to sending the authentication command.

It should be appreciated that in the various requests, responses, commands, and replies described herein, a unique identifier or transaction identifier or other identifier may be included so that the requests, responses, commands, and replies may be identified to one another through the various interactions of the system 100 and method 300.

Upon receipt of the authentication command from the issuer 108, the card device 114 instructs the consumer's authentication at the indicator 124, at 316. Specifically, in this embodiment, the card device 114 causes an LED associated with the indicator 124 to blink at a defined interval (e.g., two times per second, etc.). It should be appreciated that apart from the LED associated with the indicator 124, depending on the particular type, the indicator 124 may otherwise indicate to the consumer 112 to authenticate himself/herself at the card device 114. In this embodiment, when the consumer 112 sees the blinking at the LED of the indicator 124, the consumer 112 provides, at 318, a fingerprint to the sensor 122 of the card device 114. In response, the card device 114 captures (directly at the card device) fingerprint data for the fingerprint, at 320, via the sensor 122. The card device 114 then compares, at 322, the captured fingerprint data to reference data for a reference fingerprint stored in the card device 114 (e.g., in the memory 204, etc.) in order to authenticate the consumer 112 (in a generally conventional manner).

When a match is determined, the consumer 112 is authenticated and the card device 114 returns, at 324, a command reply (including a flag indicating the match, and thereby indicating a successful authentication) to the issuer 108, via the network 110. The issuer 108, in turn, informs the ACS 120 of the authentication. And, in connection therewith, the issuer 108 provides and/or generates an authentication code for the authentication of the consumer 112 and purchase transaction. In turn, the ACS 120 provides a results response to the directory server 118, at 326, which is forwarded, from the directory server 118, to the MPI 116, at 328. As above, the results response includes, among other things, the authentication code for the purchase transaction by the consumer 112 (e.g., as part of an AAV representative of the authentication of the consumer 112, as is conventional and as is consistent with the 3D Secure™ specification; etc.).

Conversely, when authentication of the consumer 112 at the card device 114 is not successful (e.g., when the biometric data is not captured at the card device 114 and/or when a match is not determined, etc.), the card device 114 transmits a command reply back to the issuer 108 reporting the unsuccessful authentication. The results response, then, may include an indication that the consumer 112 is not authenticated, whereby the merchant 102 may stop the transaction (or, potentially, require the consumer 112 to try either the transaction or the authentication again or utilize a different form of payment).

With continued reference to FIG. 3, when the consumer 112 is authenticated, the merchant 102 compiles and transmits an authorization request for the purchase transaction, at 330, to the acquirer 104. The authorization request includes the details of the desired purchase transaction (e.g., a PAN or token for the consumer's payment account, an amount of the transaction, a merchant ID for the merchant 102, etc.) and further includes the authentication code provided from the ACS 120 in the authentication response. As is conventional, the acquirer 104 forwards the authorization request to the payment network 106, at 332, which, in turn, forwards the authorization request to the issuer 108, at 334. The issuer 108 then determines to approve or decline the purchase transaction, at 336, based on the authentication of the consumer 112 (or more broadly, presence of the AAV indicating that the consumer 112 has been authenticated; etc.) and on one or more other factors (e.g., account standing, account balance, available funds, etc.).

Thereafter in the method 300, at 338, the issuer 108 compiles and transmits an authorization response (or reply) to the payment network 106. The authorization response includes the details of the transaction along with an indicator of whether the transaction is approved or declined. The authorization response is forwarded, in turn, from the payment network 106 to the acquirer 104, at 340, and is then forwarded from the acquirer 104 to the merchant 102, at 342, whereupon the merchant 102 is able to complete the interaction with the consumer 112.

Again, as described above, the card device 114 may be used in purchase transactions at physical merchant locations. Such purchase transactions may involve contact or contactless communication by the card device 114 with POS terminals (or other terminals such as ATM terminals or other self-checkout terminals, etc.) at the merchant locations. With that in mind, it should be appreciated that card device 114 may then be used to authenticate the consumer 112 at the physical merchant locations in the same general manner described herein in the system 100 and method 300 (whereby the card device 114 may still function as an on-card authentication device, for example, in response to an instruction presented at the indicator 124 to the consumer 112 as part of the consumer 112 performing a transaction at a physical merchant location).

In view of the above, the systems and methods herein permit authentication of consumers, via biometrics, at card devices, to be performed even for online transaction or other transaction where the consumers are not present at physical merchant locations. In this manner, authentication is enhanced over prior methods of authentication associated with these types of payment account transactions (at virtual merchant locations), whereby risk of fraud associated with these types of transaction is reduced. By the systems and methods herein, flows associated with authentication of consumers diverge from their convention paths, whereby card devices that include indicators (i.e., to indicate authentication commands and/or instructions) and modems (i.e., to communicate with issuers) are leveraged to provide the enhanced authentication (not previously available in such transactions). Moreover, the above systems and methods provide for a shift in liability to the issuers (from the merchants) in connection with authenticating the consumers, as the issuers employ the described technological solution, via biometrics, when the consumers are not physically present at the issuers and/or the merchants. In this manner, merchants may request authorization for the underlying transactions, based at least in part on the corresponding biometric authentication of the consumers, without having to modify, upgrade, adapt, etc. their infrastructure to support such biometric authentication.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) for a network transaction, receiving, at a card device, an authentication command from an issuer of a payment account associated with the card device, the card device including at least an indicator and a biometric sensor; (b) instructing, by the indicator of the card device, a user associated with the card device to provide a biometric to the card device for use in authenticating the user; (c) capturing, at the biometric sensor of the card device, a biometric data from the user when the user provides the biometric to the card device; (d) comparing the captured biometric data with reference biometric data stored in a memory of the card device; and (e) returning, by the card device, a command reply to the issuer including an authentication result for the user, based on the comparison between the captured biometric data and the reference biometric data, thereby permitting the issuer to employ the authentication result of the user in connection with the network transaction.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a request to authenticate a user in connection with a network transaction by the user at a virtual location of a merchant, the request including an indication of a payment account for funding the network transaction; (b) identifying a card device associated with the payment account based on a mobile identification number and/or an electronic serial number of the card device; (c) transmitting, by a computing device, an authentication command to the identified card device, whereby the card device instructs the user to provide a biometric authentication directly at the card device; (d) receiving, by the computing device, a command reply from the card device including a biometric authentication result for the user, based on a comparison between biometric data provided to the card device by the user and reference biometric data; and (e) providing an authentication code to the merchant in association with the network transaction, based on the biometric authentication result.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art, that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only, and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating authentication of a user in connection with a network transaction, the method comprising:

in response to an authentication request for a network transaction:
identifying, by a computing device of an issuer, a card based on the authentication request and a user profile specific to the card, the card associated with a payment account issued by the issuer, and the card having a device ID specific to the card; and transmitting, by the computing device, an authentication command to the identified card based on the device ID specific to the card;

receiving, at the card, the authentication command from the computing device via a wireless communication path between the issuer and the card, the card including a light-emitting diode (LED) and a biometric sensor;

in response to the authentication command, toggling, by the card, the LED on and off at a defined interval, thereby instructing a user associated with the card to provide a biometric to the card for use in authenticating the user;

capturing, at the biometric sensor of the card, biometric data from the user in response to the user presenting the biometric to the biometric sensor of the card;

comparing the captured biometric data with reference biometric data stored in a memory of the card; and returning, by the card, via the wireless communication path, a command reply to the computing device of the issuer including an authentication result for the user based on the comparison between the captured biometric data and the reference biometric data, thereby permitting the issuer to employ the authentication result of the user in connection with the network transaction.

2. The method of claim 1, wherein the biometric sensor includes a fingerprint sensor; and wherein the reference biometric data relates to a reference fingerprint from the user.

3. The method of claim 1, wherein the card further includes a network interface for the wireless communication path between the card and the computing device of the issuer; and wherein receiving the authentication command includes receiving the authentication command via the network interface, and wherein returning the command reply includes returning the command reply via the network interface.

4. The method of claim 1, wherein the card further includes at least one payment account credential for the payment account embossed on a first side of the card; and wherein the LED is included on the first side of the card.

5. The method of claim 1, wherein the authentication request is from a merchant plug-in (MPI) associated with a merchant involved in the network transaction, in connection with enhanced authentication for the network transaction; and wherein the method further comprises:

receiving, at the computing device, the command reply from the card; and providing the authentication result to an access control server (ACS) associated with the issuer, thereby permitting the ACS to provide an authentication code to the merchant for the network transaction.

6. The method of claim 1, wherein the card is compliant with an ISO/IEC 7810 ID-1 standard for payment cards.

7. The method of claim 1, wherein comparing the captured biometric data with the reference biometric data stored in the memory of the card includes comparing, by the card, the captured biometric data with the reference biometric data in the memory.

8. A card associated with a payment account, the card comprising:

a card body having a front side and a back side;

a fingerprint sensor;

an indicator disposed on the front side of the card body and configured to output an instruction to a user associated with the card; and a processor coupled to the fingerprint sensor and the indicator, the processor including reference fingerprint data for the user and configured to:

receive an authentication command from a computing device of an issuer of a payment account associated with the card via a wireless communication path between the computing device of the issuer and the card, in response to a network transaction by the user involving the payment account;

toggle the indicator on/off at a defined interval, thereby instructing the user associated with the card to present a fingerprint of the user to the fingerprint sensor of the card;

capture, via the fingerprint sensor, fingerprint data from the user;

compare the captured fingerprint data with the reference fingerprint data in order to authenticate the user; and transmit, via the wireless communication path, a command reply to the computing device of the issuer including an authentication result for the user, based on the comparison between the captured fingerprint data and the reference fingerprint data, thereby permitting the issuer to employ the authentication result of the user in connection with the network transaction.

9. The card of claim 8, further comprising a network interface in communication with the processor; and wherein the processor is configured to transmit the command reply to the computing device of the issuer via the network interface.

10. The card of claim 9, wherein the indicator includes a light-emitting diode (LED).

11. The card of claim 8, wherein the processor includes an EMV chip.

12. The card of claim 8, wherein the card body is compliant with an ISO/IEC 7810 ID-1 standard for payment cards.

13. The card of claim 8, further comprising a power supply coupled to the fingerprint sensor, the indicator, and/or the processor.

* * * * *